United States Patent

Seki et al.

[11] Patent Number: 4,519,686
[45] Date of Patent: May 28, 1985

[54] FOCUSING SCREEN OF A CAMERA

[75] Inventors: Yasutomo Seki, Kamakura; Toshio Akiyama, Fujisawa; Norio Nakabayashi, Yokohama; Yutaka Iizuka, Fujisawa, all of Japan

[73] Assignee: Nippon Kogaku K.K., Tokyo, Japan

[21] Appl. No.: 496,201

[22] Filed: May 19, 1983

[30] Foreign Application Priority Data

May 27, 1982 [JP] Japan .................................. 57-90429

[51] Int. Cl.³ .............................................. G03B 13/24
[52] U.S. Cl. ...................................... 354/200; 350/127
[58] Field of Search ........................ 354/199, 200, 201; 350/126, 127, 128

[56] References Cited

U.S. PATENT DOCUMENTS

| | | | |
|---|---|---|---|
| 2,589,014 | 3/1952 | McLeod | 350/128 |
| 3,149,547 | 9/1964 | Jurenz | 354/200 |
| 3,346,674 | 10/1967 | Kidder | 350/126 |
| 4,071,292 | 1/1978 | Ise et al. | 350/128 |

*Primary Examiner*—A. A. Mathews
*Attorney, Agent, or Firm*—Shapiro and Shapiro

[57] ABSTRACT

A focusing screen capable of transmitting light therethrough and disposed between an objective lens and an eye-piece includes a surface formed with a large number of substantially hemispherical faces of irregular sizes disposed irregularly. The radius of curvature of the hemispherical faces is within the range of 8.5 to 52.8 μm and the height thereof is within the range of 1.5 to 3.6 μm.

8 Claims, 12 Drawing Figures

FOCUSING SCREEN OF A CAMERA

BACKGROUND OF THE INVENTION

1. Field of the Invention

This invention relates to a light-transmitting type focusing screen for use in the optical finder of a single lens reflex still camera or a movie camera.

2. Description of the Prior Art

The mat surface of a focusing screen used in a camera has heretofore been shaped by pressing a heated plastic plate and plastic powder against a metal mold formed by applying a plating process to a metal surface formed with fine concavities and convexities by sandblast, and transferring the fine concavities and convexities of the metal mold onto the surface of the plastic plate. The surface of the focusing screen thus manufactured has the characteristic of causing the light transmitted through the focusing screen, i.e. the light travelling from the objective lens to the eye-piece portion, to be diffused within a relative wide angle range, and accordingly, the percentage of the light directed to the eye-piece portion is small and the finder picture plane is dark. The finder picture plane could be made bright by selecting a fine particle size of the sandblast and decreasing the height of the concavities and convexities during the manufacturing process of the focusing screen, but if this is done, the focus condition of the object image formed on the focusing screen will not change much between the in-focus state and the out-of-focus state and the resultant focusing screen will be low in focus detection accuracy.

SUMMARY OF THE INVENTION

It is an object of the present invention to provide a focusing screen which gives a bright field of view to the finder.

It is another object of the present invention to provide a focusing screen which enables sufficient distance measurement accuracy to be obtained.

The invention will become fully apparent from the following detailed description thereof taken in conjunction with the accompanying drawings.

DESCRIPTION OF THE PREFERRED EMBODIMENTS

Figure 1:
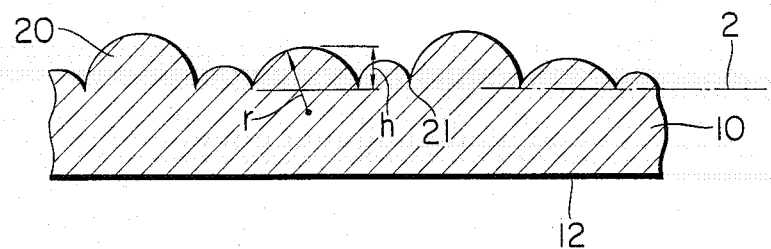
FIG. 1 an enlarged cross-sectional view of a focusing screen according to a first embodiment of the present invention.

FIG. 1 shows an enlarged cross-sectional view of a focusing screen according to an embodiment of the present invention.

The focusing screen 10 is provided with a number of hemispheres of irregular sizes irregularly disposed with their bottom surfaces substantially coincident with the vicinity of a focal plane 2. The underside 12 of the focusing screen 10 is usually formed by a flat surface as shown, but may alternatively be formed by a spherical surface, a non-spherical surface or a Fresnel surface to provide the focusing screen itself with a lens action.

Figure 2A:
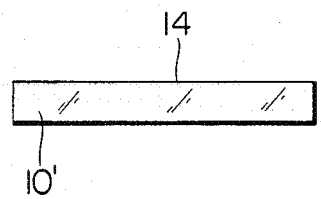
FIG. 2 illustrates the manufacturing process of the focusing screen of FIG. 1, FIG. 2A showing a glass substrate, FIG. 2B showing the glass substrate after sandblast, and FIG. 2C showing the glass substrate after chemical erosion process.
Figure 2B:
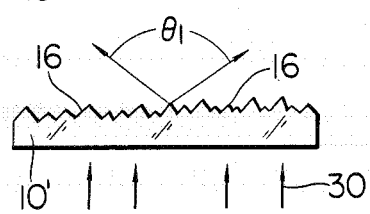
Figure 2C:
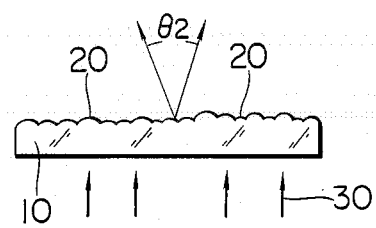

Such focusing screen 10 may be manufactured through the steps of a process as shown in FIGS. 2A–2C. First, a planar transparent glass plate 10' as shown in FIG. 2A is prepared. A number of fine concavities and convexities of different sizes are then formed irregularly on the surface 14 of the glass plate 10' by sandblast. FIG. 2B shows a cross-section of the glass plate after the sandblast.

The fine concavities and convexities of the surface of the glass plate formed by sandblast are usually sharply pointed and the sloping surfaces thereof tend to serve to totally reflect the transmitted light 30 from therebelow and, as a result, the angle distribution of the diffused light of the transmitted light 30 on the exit surface extends over a great angle $\theta_1$ about an axis perpendicular to the surface of the glass plate. This means that the percentage of the diffused light travelling toward the eye-piece portion decreases. This glass plate 10' is immersed in a chemical etching reagent containing fluoric acid. Thereby, the ends of projections 16 formed on the surface of the glass plate after the sandblast are eroded and the projections change into projections 20 whose surface is hemispherical as shown in FIG. 2C. When the glass plate is being immersed in the chemical etching reagent, if the glass plate is moved in the solution, uniform chemical erosion can be accomplished. In this manner, the glass plate is processed and a number of fine projections having hemispherical surfaces are formed on the surface of the glass plate with irregular sizes and irregular arrangement. This glass plate 10 itself constitutes a focusing screen.

The numerous hemispherical projections 20 serve to change the angle distribution of the diffused light of the transmitted light 30 on the exit surface of the focusing screen 10. That is, the total reflection caused by the concavities and convexities 16 of the glass plate of FIG. 2B scarcely occurs and the said angle distribution tends to be limited within a small angle $\theta_2$ about the perpendicular axis because the angle of refraction during the emergence is changed. As a result, more light can be directed to the eye-piece portion and thus, a bright finder is obtained.

It is to be noted that the projections 20 which are formed in the above-described manner are not limited to those having strictly hemispherical surfaces and need not be strictly hemispherical surfaces to achieve the objects of the present invention. The hemispherical surface so referred to in the present invention is a part of a substantially spherical surface and even if it includes a part of a non-spherical surface like the surface of a rice bowl, it can fully achieve the objects of the present invention.

A metal mold may be made with the thus formed glass plate 10 as the original mold and a plastic focusing screen of the same shape as FIG. 2C may be obtained from the metal mold by plastic molding. In that case, the original mold of FIG. 2C may be made of not a glass plate but a hard fragile substance such as a ceramic plate or a silicon single crystal plate.

Figure 3A:
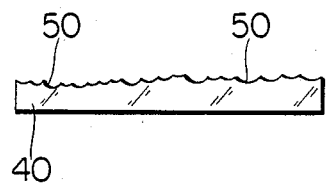
FIG. 3A is a cross-sectional view of a focusing screen according to a second embodiment of the present invention.
Figure 3B:
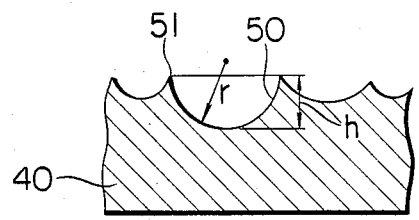
FIG. 3B is an enlarged cross-sectional view of the focusing screen of FIG. 3A.

Further, a focusing screen 40 in which a number of fine depressions 50 having hemispherical surfaces as shown in FIG. 3A are irregularly arranged can be obtained from the original plate having the cross-section as shown in FIG. 2C. The thus obtained focusing screen 40 also has an effect similar to that of the focusing screen 10. FIG. 3B shows an enlarged cross-sectional view of such focusing screen 40. The surface height, the radius of curvature, etc. of the hemispherical concavities and convexities formed on the surface of the focusing screen can be adjusted by suitably selecting the conditions such as the particle size of the sandblast applied to the surface of the glass plate and the sandblast time.

The size of the projections 20 or the depressions 50 will now be described. The height or depth of the projections 20 or the depressions 50 shown in FIGS. 1 or 3B is h and the radius of curvature thereof is r. Three types of focusing screens a, b and c having different depths h and different radii of curvature r are prepared and the light diffusing characteristics thereof are compared.

The focusing screen a has a surface formed with a number of hemispherical projections having chiefly $h=3.3$ $\mu$m and $r=19.0$ $\mu$m, the focusing screen b has a surface formed with a number of hemispherical projections having chiefly $h=2.1$ $\mu$m and $r=21.6$ $\mu$m, and the focusing screen c has a surface formed with a number of hemispherical projections having chiefly $h=1.7$ $\mu$m and $r=26.5$ $\mu$m. In any of the focusing screens a, b and c, the height and radius of curvature of the projections are limited to $1.5$ $\mu m \leq h \leq 3.6$ $\mu$m and $8.5$ $\mu m \leq r \leq 52.8$ $\mu$m.

Figure 4:
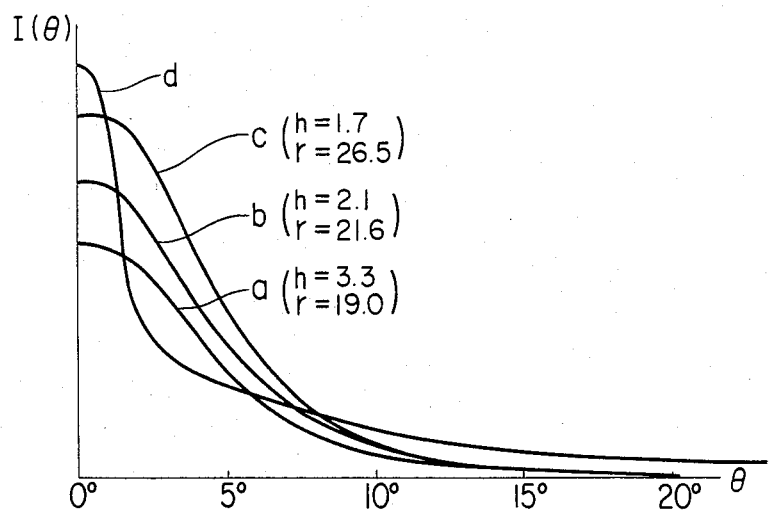
FIG. 4 is a graph showing the diffusing characteristics of light transmitted through the focusing screens.

FIG. 4 shows the diffusing characteristics of the focusing screens. In FIG. 4, the abscissa represents the angle $\theta$ relative to the direction perpendicular to the focusing plate which is shown in FIG. 2C, and the ordinate represents the diffusion transmission factor $I(\theta)$ at the angle $\theta$. Curve d in FIG. 4 shows for comparison the diffusing characteristic of the prior art focusing screen shown in FIG. 2B. The diffusing characteristics of the focusing screens a, b and c are shown as curves a, b and c, respectively.

Figure 5:
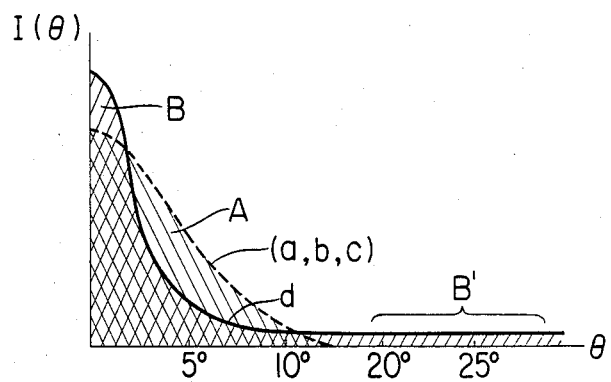
FIG. 5 is a graph showing the comparison between the diffusing characteristic of the focusing screen of the present invention and that of the focusing screen of the prior art.

The features of the characteristic curves a, b and c are represented as a curve (a, b, c) in FIG. 5. Qualitatively, the area A of the portion delimited by the vertical axis $I(\theta)$ and the horizontal axis $\theta$ and the characteristic curve (a, b, c) in FIG. 5 is substantially equal to the area B of the portion delimited by the axes $I(\theta)$ and $\theta$ and the characteristic curve d, and corresponds to the quantity of light entering the focusing screen (in case of a single lens reflex camera, the quantity of light directed from the quick return mirror). Accordingly, if the quantities of light entering the respective focusing screens are equal, much light will be diffused at a great angle $\theta$ with respect to the direction perpendicular to the focusing screen in the prior art device. This is indicated by B' in FIG. 5. In case of a single lens reflex camera, the angle $\theta$ of the light actually directed from the focusing screen to the pentaprism is generally up to about 20° and therefore, in the prior art device, a loss of quantity of light corresponding to the quantity of light which corresponds to the area of the portion B' will occur and the finder picture plane will be dark by an amount corresponding to B'. That is, the focusing screen will be correspondingly dark. In the focusing screen provided by the present invention, there is no light which is diffused at the great angle $\theta$ as shown, and there is no loss of quantity of light which corresponds to the portion B'.

When how much the out-of-focus state of the focusing screens a, b and c is varied by a change of the focus position was examined, a sharp object image could be formed on the focusing screen when in the in-focus state, and a desired amount of out-of-focus could be obtained as the lens deviated from its focus. Accordingly, it has also been found that good focus detection accuracy can be obtained.

All of the focusing screens a, b and c are of the same degree in respect of the focus detection accuracy, but the brightness of the focusing screen was better in the order of the focusing screens c, b and a as is apparent from FIG. 4.

Three specific examples have hitherto been described, but according to the experiment, it has been found that a focusing screen which is good in focusing accuracy and moreover bright can be obtained if it is formed so that the surface height of the projections 20 or the depressions 50 is within the range of $1.5$ $\mu m \leq h \leq 3.6$ $\mu$m and that the radius of curvature thereof is within the range of $8.5$ $\mu m \leq r \leq 52.8$ $\mu$m.

In the focusing screens shown in FIGS. 1 and 3B, relatively acute angles are formed at the contact portions 21 and 51 of adjacent projections and depressions and these acute-angled portions may appear in the form of black spots in the finder picture plane particularly when an interchangeable lens of great F-number is mounted on the camera. However, if the focusing screens are constructed such that the size of each projection or each depression is within the above-mentioned ranges, the problem of such black spots will not, in practice, occur.

According to our experiment, it has been found that there can be obtained a focusing screen particularly preferable in respect of focus detection accuracy, brightness of the focusing screen and lack of black spots by selecting the size of the projections or the depressions particularly within the ranges of $1.65$ $\mu m \leq h \leq 3.30$ $\mu$m and $16.7$ $\mu m \leq r \leq 26.5$ $\mu$m.

When an interchangeable lens of small F-number is mounted on a camera provided with a focusing screen, light whose angle $\theta$ with respect to the direction perpendicular to the focusing screen is generally up to about 0°–20° contributes to the brightness of the finder picture plane. Also, where an interchangeable lens of great F-number is mounted on the camera, light whose angle $\theta$ is generally up to about 0°–1° contributes to the brightness of the finder picture plane. According to our experiment, when the finder was observed by adopting a focusing screen having hemispherical projections or depressions in which $1.5$ $\mu m \leq h \leq 3.6$ $\mu$m and $8.5$ $\mu m \leq r \leq 52.8$ $\mu$m, a bright finder picture plane was obtained even for an interchangeable lens of F1.2 or an interchangeable lens of F32. That is, there was obtained a focusing screen which did not require an interchange depending on the F-number of the interchangeable lens.

Figure 6A:
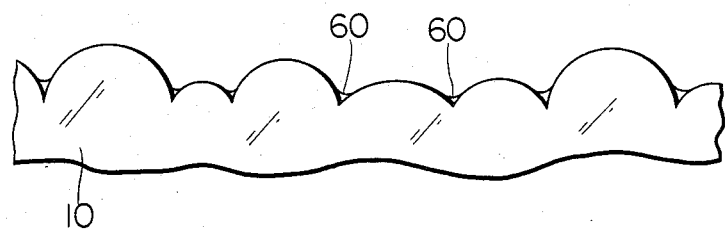
FIG. 6 illustrates the manufacturing process of a focusing screen according to a third embodiment of the present invention, FIG. 6A showing a condition in which silicone oil or the like is applied to the focusing screen of FIG. 2C, FIG. 6B showing the focusing screen obtained thereby, and FIG. 6C showing a condition in which silicone oil or the like having a low viscosity is applied to the focusing screen.
Figure 6B:
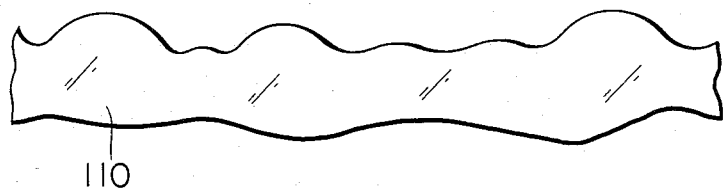
Figure 6C:
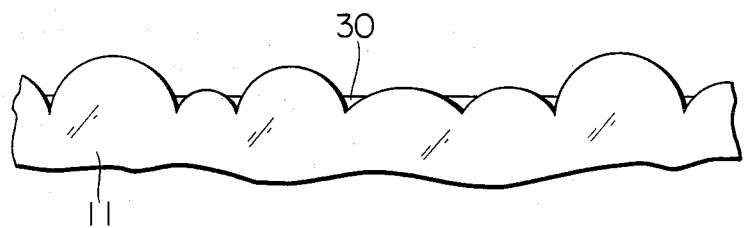

FIGS. 6A—6C show an embodiment in which the aforementioned contact portions 21 of the adjacent projections are prevented from appearing on the finder picture plane. FIG. 6A shows a transparent organic substance or silicone oil 60 as applied to the rugged surface of the focusing screen 10. If the focusing screen is so constructed, the grooves between the projections are filled up and form gentle curves by the surface tension of such resin or oil. Accordingly, there can be obtained a focusing screen of a cross-sectional shape as shown in FIG. 6B.

If the viscosity of the filling resin or oil 30 is low, the portions between the projections will become approximate to a plane as shown in FIG. 6C.

Figure 7:
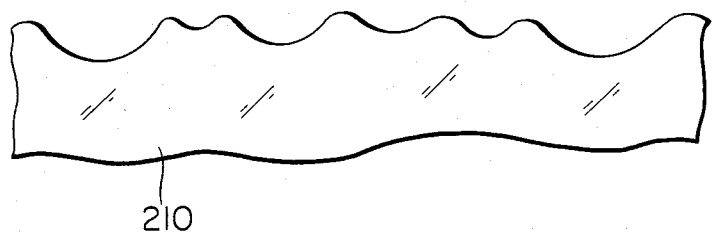
FIG. 7 shows a focusing screen according to a fourth embodiment of the present invention.

A metal mold may be made with the glass plate 110 obtained in FIG. 6B as the original mold and a focusing screen may be obtained from such metal mold, whereby a focusing screen 210 in which no black spots appear can be made as shown in FIG. 7.

Although embodiments have been described with respect to a case where irregularities are provided on an entire surface of a focusing screen, the present invention is also applicable to a case where irregularities are provided on a portion of the focusing screen.

We claim:

1. A focusing screen capable of transmitting light therethrough and disposed between an objective lens and an eye-piece, said focusing screen comprising:

a surface formed with a large number of substantially hemispherical faces of irregular sizes disposed irregularly, the radius of curvature of said hemispherical faces being within the range of 8.5 to 52.8 $\mu$m and the height thereof along the screen thickness being within the range of 1.5 to 3.6 $\mu$m.

2. A focusing screen according to claim 1, wherein the radius of curvature of said hemispherical faces is within the range of 16.7 to 26.5 $\mu$m and the height thereof is within the range of 1.65 to 3.30 $\mu$m.

3. A focusing screen capable of transmitting light therethrough and disposed between an objective lens and an eye-piece, said focusing screen comprising:

a surface formed with a large number of substantially hemispherical projections of irregular sizes disposed irregularly, the radius of curvature of said hemispherical projections being within the range of 8.5 to 52.8 $\mu$m and the height thereof along the screen thickness being within the range of 1.5 to 3.6 $\mu$m.

4. A focusing screen according to claim 3, wherein said projections are disposed in close contact with one another on said surface.

5. A focusing screen according to claim 3, wherein said projections are disposed at predetermined intervals on said surface and the surface of said focusing screen between said projections is formed by a curved face.

6. A focusing screen according to claim 3, wherein said projections are disposed at predetermined intervals on said surface and the surface of said focusing screen between said projections is formed by a planar face.

7. A focusing screen capable of transmitting light therethrough and disposed between an objective lens and an eye-piece, said focusing screen comprising:

a surface formed with a large number of substantially hemispherical depressions of irregular sizes disposed irregularly, the radius of curvature of said hemispherical depressions being within the range of 8.5 to 52.8 $\mu$m and the depth thereof along the screen thickness being within the range of 1.5 to 3.6 $\mu$m.

8. A focusing screen according to claim 7, wherein said depressions are disposed at predetermined intervals on said surface.

* * * * *